3,395,756
PROCESS FOR THE EXPLOITATION OF BITUMENS-CONTAINING STRATA BY UNDERGROUND PREPARATION AND GASIFICATION
Hans Lange, Wietze Kreis Celle, Germany, and Gunther Schlicht, deceased, late of Hamburg, Germany, by Erika Marie Elisabeth Schlicht, legal representative, Hamburg-Othmarschen, Germany, assignors to Deutsche Erdol-Aktiengesellschaft, Hamburg, Germany
No Drawing. Continuation-in-part of application Ser. No. 242,868, Dec. 3, 1962. This application Oct. 23, 1965, Ser. No. 505,141
7 Claims. (Cl. 166—36)

This application is a continuation-in-part of application Ser. No. 242,868, filed Dec. 3, 1962, now U.S. Patent No. 3,279,540, and applicants rely upon the disclosure, rights and priorities contained therein.

This invention relates to an improved method for conditioning underground coal deposits and extracting bitumens from the ground.

It is known to create an underground generator in a bitumens-containing strata where the generator is bounded by so-called cleavage line boreholes and treatment boreholes for division of the generator into treatment sections to simultaneously or successively treat the strata. It is also known to introduce a heat-transfer medium into a treatment borehole under pressure along with heating of the medium by circulation through a nuclear reactor or other heat source. By this method bitumens in an underground strata are dislodged and heated so as to form energy rich masses which can produce or be converted into gases. The treatment sections may be worked simultaneously or successively because the heat introduced through the treatment boreholes must follow predetermined paths in its passage through the strata. In this manner, it has been possible for the heat which has spread out laterally from the treatment borings to be brought as initial heat to the strata to be gasified and after gasification of one such section of the underground generator to make use of the stored heat in the upper strata for preheating the gasification air that is on its way to the other sections of the underground generator.

The burning and gasification zone of the underground generator thus receives at every time and in every subsection, additional heat, whereby it is kept at a high temperature and provides a well preheated roof structure so that the advancing burning and gasification zone can always be kept at an advantageously high temperature.

This reaction heat in the underground generator, which has been intensified by circulating the heat transfer medium in heat exchange with a nuclear reactor, and which has a high energy value, can be referred to as double thermal impact.

If this uncontrolled nuclear fission in the reactor cannot or must not occur, then the coal will not be subjected either to the powerful mechanical shock or to the increased heat.

When the double thermal impact stops, the ensuing gasification process will go on more slowly and at a lower temperature, so that in the temperature region of 340–425° C., the coal will be softened over a wider region. As a result, the fissure or pore formation which has been started, is diminished or reversed and inadequate yield or poor quality of the gas presents a problem.

It is an object of this invention to use various measures and steps to correct the unfavorable effects on the gasification process which result from an inadequate disruption of the coal after cessation of the double thermal impact.

It is a particular object of the present invention to prepare a deposit of coal for extraction when the temperature of the coal deposit is in the plastic temperature range.

Upon further study of the specification and appended claims, other objects and advantages of this invention will become apparent.

To attain these objects, there is provided the following modified procedure. It is defined as follows:

(1) Selecting a heat transfer medium comprising a mixture of non-condensible gases and a mixture of condensible hydrocarbons having different boiling points between 250 and 300° C. and heating the heat transfer medium;

(2) Introducing the heated heat transfer medium through treatment boreholes into a coal deposit at a pressure above the fracturing pressure of the coal, creating fissures and shear surfaces in the coal stratum and heating the fissures and shear surfaces to just below the softening point of coal which is 340 to 425° C.;

(3) Cooling the treatment borings by the circulation of unheated liquid light hydrocarbons;

(4) Introducing a mixture of oxygen carriers or dissolved explosives in low boiling hydrocarbons having a vaporization temperature below the softening temperature of the coal and vaporizing all solvents by subsequent injection of hot heat transfer medium to precipitate the explosives or oxygen carriers in highly active form;

(5) Introducing air and hydrocarbon vapors into the treatment borings at pressures greater than the breaking pressure of the coal, igniting and burning the mixtures in the previously formed fissures and shear surfaces whereby the applied pressure keeps the fissures open during the plastic state of the coal until the upper temperature limit of 425° C. is exceeded and continuation of the process until flow resistance is substantially diminished and products of combustion are collected from recovery boreholes; and (6) Introduction of oxidizing agents and commencement of the regular combustion of the coke resulting from the previous steps.

(The materials are introduced into the strata through boreholes which are generally vertical. If the work is being done from shafts or excavations, then the boreholes are generally horizontal.)

With respect to the details of steps 1 and 2, condensible hydrocarbons are used as the heat transfer media, and are passed through a heat exchanger for receiving heat (about 350° C.) from a heat source such as an atomic reactor, and under pressure sufficient to break the underground deposits (about 20–35 atm. per 100 m. depth), so that the heat can advance into the strata. Preferably, the hydrocarbon should have a normal boiling point of about not less than 50° C. Specific examples of such hydrocarbons are benzene or a mixture of 10% pentane, 25% hexane and 65% heptane, or a mixture of 15% pentane and 85% heptane.

In addition, it is necessary to employ incondensable gases such as inert gases, light hydrocarbons such as methane, and gaseous oxygen or air in the heat transfer medium in predetermined amounts. These added materials will increase the volume of the heat transfer vapors and will therefore increase the depth of penetration thereof into the fissures and cracks of the strata beyond where pure gases would penetrate, and upon condensation will cause the deposition of large numbers of tiny globules which will furnish many points of support for the adjacent surfaces. It is thus apparent that the incondensable gases must remain gaseous under 200 atm. (absolute) pressure and temperature as low as 150° C. The ratio of condensibles to incondensibles, on a weight basis, is about 100 parts condensibles to about 30 parts, preferably 20 parts incondensibles.

After the strata have been loosened by means of pressure and thermal liquids and gases in the region of the underground generator, smaller explosions may be set off in the boreholes. The strata are then exposed to pressure waves from the cleavage line borings and also to the weight of the fromations above, which will cause the entrapped gaseous globules to become compressed and thus serve to store up energy. After passage of the pressure waves, these entrapped globules expand so as to restore the porosity and open up the crevices which existed previously.

After the preliminary treatment steps 1 and 2, steps 3, 4 and 5 are performed wherein oxygen carriers such as potassium nitrate or dissolved explosives are introduced with the heat transfer medium into the strata and distributed over a wide region. Suitable heat transfer materials are hydrocarbon fractions with different boiling points and eventually also with separated boiling points so that separate condensations will occur. As a principal heat transfer medium there is preferably used a hydrocarbon fraction which under 1 atm. has a boiling point of 250–300° C. Since the heat transfer medium of this invention is always under a certain positive pressure in the strata, it will remain liquid in the heat exchanger of the reactor and will therefore not form incrustations which would lower the quantity of heat transferred. In order that the oxygen carriers and the explosives may come into action at certain distances from the boreholes, low boiling point liquids (B.P. less than about 100° C.) are used as their solvents. Such solvents will be vaporized by the previously warmed regions of the strata so as to set free the dissolved materials which can then become active. At desired places, localized combustion can thus be brought about, which can be propagated in the presence of combustible gases. Explosive blasting materials will also cause gas formation with a breaking up of the strati. The explosive charges in the cleavage guiding holes are preferably set off simultaneously. As preferred oxygen carriers or explosives there can be mentioned TNT, black powder or a mixture of 1 kg. benzene and 1.1 kg. oxygen 95%.

As modification of this process, a small preliminary explosion may be set off in the boreholes that have not yet been lined with tubes which will initiate the formation of fissures in the immediate surroundings. After the boreholes are redrilled, the fissures and boreholes are again filled with dissolved explosives so that the principal explosion thus produced will exert a strongly propagated disrupting action in the strata.

As solvents for the oxygen producing substances or explosives, certain components of the heat transfer medium that is sent to the treatment or cleavage guiding medium may be used. By gradual or sudden changes in the compositions of its components, the heat transfer agent can also be made to serve as a solvent. Low boiling hydrocarbons are primarily suitable for this purpose, depending on the desired kind of action. Examples of preferred solvents are benzene, xylene and toluene.

The transport of the oxygen carrier or the explosive and its fixation is accomplished as follows: A heat transfer medium, after passage through the heat exchanger of a reactor, is introduced into the strata which are partly opened up by fissure formation, warming and partial degassing. If the reactor is only to give off heat, and the uncontrolled nuclear disintegration, as above mentioned, cannot or must not be brought about, then the reactor can obviously be substituted by some other source of heat, as for example an electrically energized immersion heater or by a heat exchanger supplied by heat from another source.

After the required operation has commenced, a low boiling solvent is introduced cold into the strata after having by-passed the heat exchanger as in (3) above. After the strata have been locally cooled in that manner, a solution of an oxygen liberating substance or an explosive in a volatile solvent is introduced as in step (4) until it has reached the required distance from the borehole, the distance having been calculated with due consideration to the subsequent introduction of the heat carrying medium. The heat transfer medium is then introduced, which after a certain time, will vaporize the solvent that was used for introducing the oxygen liberating substance or the explosive, so that these materials will now be present in highly effective form. The dissolved explosive is relatively safe to handle. If the separation of the explosive by vaporization is impossible or impractical, then use is made of a solvent which upon mixture with another subsequently introduced solvent will cause precipitation of the explosive or the oxygen carrier.

If a formation that has been thus treated with heat and explosives becomes plastic and difficultly permeable in places, the entrapped gas bubbles or the products of combustion of the introduced hydrocarbons, or of those from the formation, or the gases from the detonated explosives, will cause the strata to again become partly porous after the pressure has been removed.

In some formations with solid bitumens, it may not be possible to produce adequate fissures by means of small explosives and pressure waves. The widely varied structure of coal, the varying depths of coal deposits, and the different thicknesses of its beds, lead to a wide variety of conditions, and it is therefore necessary to increase the fissure formation which has been initiated by the use of vapors.

This can be accomplished by thermal stresses in the formation, which will cause the formation of fissures and will enlarge or supplement the fissures which have been produced by pressure and explosions. Thermal stresses occur when heat is delivered quickly into a restricted portion of the formation, which will produce large temperature differences in closely adjacent portions of the bitumen or coal. There will then be hot regions in the fissures in immediate proximity to cold regions. The resulting thermal stresses will produce more fissures, as can be observed during the heating of coal in retorts or coke ovens.

For this purpose it is necessary that a large quantity of heat be introduced quickly into the formation and across long and numerous paths. This is accomplished by a pneumatically accumulated thermal shock delivering a large amount of heat by means of vapors and gases.

The amount of energy that is introduced by a heated liquid is considerable. Injection of 75 m.$^3$ of a pure liquid under 320 atm. pressure causes fissure formation over a circumference of 80 m. around the treatment borehole. If, however, vapors or gases are used instead of the liquid, and are introduced under the same pressure, there will be stored in the formation about 75 m.$^3 \times 320$ atm.$=24,000$ m.$^3$ of gases and vapors under pressure.

If the energy of the source of heat is not equal to the energy desired to be stored, then additional heat can be produced by igniting and burning the hydrocarbon and air mixture which passes from the treatment borehole into the formation. This additional burning is continued until the frictional resistance of the opened fissures has become so small that the gasification and vaporization can itself be omitted, with the injection of air alone into the formation.

If the formation is to be rendered porous by fissure and pore formation between the treatment borehole and the cleavage directing boreholes by heat and pressure alone and without additional nuclear explosions, then inert gases or air must be added to the medium which delivers heat to the introduced hydrocarbons, and in amounts sufficient to produce strata-supporting bubbles. In order to introduce the large quantities of this gas-air mixture into the treatment boreholes in the most efficient manner, and to have convenient control over it both at the inlet and at the outlet end of the treament borehole, it may be advantageous to perform some preparatory operations in both the treatment and the cleavage guiding boreholes.

For this purpose a small explosion is set off in each borehole to produce fissures in the immediate neighborhood of the borehole for increasing the free surface in that region.

After these explosions, the holes are redrilled and lined with casings. In every treatment borehole certain masses of liquid hydrocarbons loaded with gases for producing strata producing bubbles are injected under pressure greater than the disruption pressure of the formation, whereby fissure formation will be increased and extended while the gaseous bubbles will keep the fissures open.

It is not considered practical to carry out such treatments with larger masses of liquids (about 0.25 liter per cm.³ carbon) because incompressible liquids will quickly break through any boundary. The pressure action will then be of only short duration and will spontaneously drop off as soon as a fissure extends all the way over to a cleavage directing borehole so that additional fissures will not be formed, at least not at any great distance from the treatment borehole. Only one such fissure will prevent such an underground generator from being operated successfully because it will then be impossible to control the movement of gases and vapors.

If now instead of a liquid, a gas is injected into the coal stratum, it will, because of its much lower viscosity, penetrate into tiny capillary fissures and microscopic pores. Since it is compressible, it will store up a substantial amount of pressure-energy, even though the pressure may increase only slowly. If the breaking strength of the formation is exceeded, then fissure formation will result. The pressure, however, drops only slightly, and will be brought up again until the initially produced fissure reaches a cleavage directing borehole. The large amount of stored up gas still contains much pressure-energy, which continues to act on all sides and will produce fissures which will lead to the other cleavage directing boreholes. The accumulation of vapors and gases will thus cause the disruption process to continue for a long time. If the compressed fluids have much heat stored up in them, then they will pass more quickly through the larger fissures and thus produce strong local heating, which will result in thermal stresses between these hot regions and adjacent cooler regions, and that will in turn lead to the formation of more fissures.

In recapitulation, it may be stated that the last-described process, which does not involve the setting off of any powerful blasts, is carried out by first pretreating the boreholes to disrupt the formation in their immediate neighborhoods, and then passing vaporized or liquid hydrocarbons, steam and gases such as air over a heat-exchanger and then into a treatment borehole under a pressure greater than the fracturing pressure of the formation, until a fissure has broken through under high pressure to a cleavage directing borehole.

In the ensuing second phase, which is characterized by high heat production, the mixture of hydrocarbon vapors and air that leaves the treatment borehole is ignited and generates a substantial amount of heat during the time that it burns. The thermal strains produced in this manner cause a widening of the fissures and increased porosity of the coal.

The ignition of the mixture can be effected either by means of an electrically operated igniter, or by a short time admixture of vapors with an ignition point below the surface temperature of the heat exchanger. Combustion can also be initiated by the use of platinum black.

In this second phase, the expansion of the forced-in air which has resulted from the generation of heat has reduced the quantity of hydrocarbons to such an extent that there will be present an excess of oxygen which will prevent any occurrence of carbon black which could cause clogging of the fissures. To compensate for the diminishing supply of steam at the source of heat, additional water is added for conversion into steam. In porous formations the steam or the water, possibly mixed with hydrocarbons which could be very viscous, may conveniently be introduced through a separate pipe into the formations in which the pipe passes through a packer which separates the upper space where air or oxygen-enriched air is used for burning the light hydrocarbons, from the lower space where the second phase is carried out. The movement of the lighter materials in the upper space assists in the movement of the materials in the lower space in the region of the treatment borehole, as in a direction toward a cleavage guiding hole. During the early part of the steaming process, a water gas reaction may occur.

Steps 3, 4 and 5 end when the the section that is being treated with pressure and heat has acquired the necessary porosity. In order to avoid a deterioration of the heating value of the vaporization gas by admixture with the products of combustion from the second phase, it should be terminated as quickly as possible. A time period of about 4 days should be sufficient.

Still another modification includes circulating the heat transfer fluid between the borings leading to the upper strata of the formation. The heat transfer medium which has broken through to the cleavage directing borings is brought above ground to be reheated, and is then returned to the treatment borehole for another passage from the treatment to the cleavage directing borehole. This medium, which is now enriched with hydrocarbons, and from which no products have been separated, is continued in circulation until the desired effect is produced. Such an effect consists of a heating up of the formation together with increased permeability and/or porosity. As heat carriers, gaseous hydrocarbons mixed with liquid hydrocarbons of widely different boiling points may be used.

In step 6 which has now commenced, air alone which has been preheated at the combustion front of step 5 is introduced for vaporizing and degassing the bituminous formations. From this point on, the process continues as described in our copending patent application Ser. No. 216,271, filed Aug. 7, 1962, and now U.S. Patent No. 3,283,814.

Without further elaboration, it is believed that one skilled in the art can employ this invention to full advantage. Consequently, the following preferred specific embodiments are to be considered exemplary and not in any way limitative of the remainder of the specification and appended claims.

EXAMPLE 1

A coal stratum of brittle mineral coal having a thickness of 1.50 m. is deposited in a depth of 320 m. A heat source, for instance a power reactor, evaporates in the pressure bore under simultaneous emission of radiation energy, e.g., of 90% of heat energy and 10% of radiation energy with 500,000 kcal./h. for preheating for 2–5 days, 500 kg. of liquid hydrocarbons having a large boiling range, for instance 10% pentane, 25% hexane, 65% heptane and 3,000 Nm.³/h. of compressed air, to 320° C. at a pressure of 90 atmospheres absolute. At this pressure the coal cracks and therefore, if said pressure is maintained, the hydrocarbon flows through the coal stratum. The vaporous hydrocarbons are condensed at the newly formed surfaces of the crevices in the direction of the depth of the layer according to the boiling point of the individual hydrocarbons and retain the compressed air of the mixture in a large number of bubbles as supports within the crevices. When an ignition is caused in the pressure bore after 2–5 days, the oxygen of the compressed air burns as much coal in the tracks that the temperature in said crevices rises to more than 450° C., whereby the coal is degasified in said cracks and causes the production of stationary permeable coke. Thereafter, a further progressing degasification and gasification is possible, for instance, with 12,000 Nm.³/h. to obtain heated air enriched with 85% of oxygen at a pressure of 15 atmospheres absolute at 300° C. until the coal is completely gasified in the underground generator. The generator gas has a pressure of 12 atmospheres absolute, and per 1 kg. of coal there are produced 2.05 Nm.³ of generator gas having a heating value of 2,800 kcal./m.³.

EXAMPLE 2

A coal deposit consisting of a tough elastic mineral coal and having a thickness of 2.20 m. is deposited at a depth of 750 m. A heat source evaporates in the pressure bore at a ratio of 500,000 kcal./h. for preheating for 2–5 days 500 kg./h. of liquid hydrocarbons having a large boiling range according to Example 1, and 3,000 Nm³/h. of compressed air to 300° C. at a pressure of 240 atmospheres absolute. At said pressure the coal becomes cracky, but the cracks close immediately after the pressure falls below the cracking pressure. In this case the supporting bubbles alone are not able to keep the cracks open. In order to obtain a depth effect, the surroundings of the pressure bore are cooled down to a temperature less than 120° C. after the preheating by means of cold hydrocarbons, so that a solution of 200 kg. of explosive TNT containing the threefold quantity of toluene and the twelvefold quantity of benzene can be distributed in the cracks formed within the pressure bore. After these explosives are distributed, compressed air in a quantity of 3,000 Nm.³/ h. at 240 atmospheres absolute and evaporated liquid hydrocarbons of a large boiling range in a quantity of 500 kg./h., for instance, 15% by weight of pentane and 85% by weight of heptane, are preheated again in a temperature up to 300° C., whereby the solvents of the explosive are evaporated to such an extent that from the preheating temperature an auto-ignition of the explosives distributed in the coal occurs, whereby the temperature in the cracks increases to such an extent, that a degasification occurs and the fusing temperature is exceeded. A heavy, pervious coke is obtained thereby, which makes it possible to initiate the degasification by means of air enriched with oxygen at a pressure of 15 atmospheres absolute.

EXAMPLE 3

The three uppermost meters of a mineral deposit having a thickness of 5 m. and being positioned at a depth of 1200 m. have a permeable structure, whereas the structure of the 2 lowermost meters is coalesced or scarcely permeable. One operates in the upper portion of the pressure bore with a disruption pressure of 360 atmospheres absolute, and for the rest as described in Example 1. Cold mixtures consisting of 1.57 kg. of $O_2$ per 1 kg. of hydrocarbons, as for instance benzene, are introduced at a quantity of 500 kg./h. per 1 kg. of thickness of the scarcely permeable deposit into the lower portion of the deposit at the disruption pressure through a separate conduit and through a bore arranged in the lower portion of the packer, for 5–6 days. However, it is also possible to use the same quantities of a mixture consisting of 3 parts of water and 7 parts of lighter hydrocarbons, as for instance, heptane. Through the progressing gasification in the upper portion of the deposit the occluded liquids are heated and caused to ignite or evaporate, whereby the lower portion of the deposit is developed for removal of the minerals.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:
1. A process for preparing for extraction underground solid bituminous deposits in the plastic temperature range of the solid bitumens comprising:
   (a) heating above ground a heat transfer medium comprising a mixture of non-condensible gases and condensible hydrocarbons;
   (b) introducing through treatment boreholes said heat transfer medium into said bituminous deposits at a pressure above the breaking pressure of said solid bitumens and at a temperature below the softening temperature of said solid bitumens;
   (c) introducing cool liquid light hydrocarbons into said treatment boreholes whereby the area around said boreholes is cooled;
   (d) introducing into said bituminous deposits a member selected from the group consisting of oxygen-releasing compositions and explosives, said member dissolved in volatile solvents and evaporating said solvents by subsequently introducing a hot fluid medium whereby said member is precipitated in a solid activated form; and
   (e) introducing a mixture of air and hydrocarbon vapors into said treatment boreholes at a pressure above the breaking pressure of said solid bitumens and igniting said mixture and said precipitated solid activated form whereby the porosity of said bituminous deposits is maintained through said plastic temperature range.

2. The process of claim 1 wherein said solid bitumens are coal.

3. The process of claim 1, wherein said condensible hydrocarbons of (a) have boiling points between 250 and 300° C.

4. The process of claim 3, wherein said condensible hydrocarbons are a mixture of hydrocarbons having different boiling points in the range 250 to 300° C.

5. The process of claim 1, wherein said softening temperature of (b) is 340 to 425° C.

6. The process of claim 1, wherein the pressure of (e) is maintained through the 425° C. upper limit of said plastic temperature range.

7. The process of claim 1, further comprising the step of introducing oxidizing agents and extracting said bituminous deposit by vaporization and gasification.

References Cited

UNITED STATES PATENTS

| 3,004,595 | 10/1961 | Crawford et al. | 166—11 |
| 3,034,579 | 5/1962 | Parker | 166—36 X |
| 3,066,733 | 12/1962 | Brandon | 166—36 |
| 3,075,463 | 1/1963 | Eilers et al. | 166—36 |
| 3,266,572 | 8/1966 | Woodward | 166—38 |
| 3,270,815 | 9/1966 | Osborn et al. | 166—36 |
| 3,279,540 | 10/1966 | Lange et al. | 166—36 |
| 3,283,814 | 11/1966 | Schlicht et al. | |

STEPHEN J. NOVOSAD, *Primary Examiner.*